C. E. GRAY.

PROCESS AND APPARATUS FOR DESICCATING LIQUID SUBSTANCES.

APPLICATION FILED SEPT. 30, 1915.

1,266,013. Patented May 14, 1918.

Inventor

Charles Earl Gray

By Church & Church

His Attorneys

UNITED STATES PATENT OFFICE.

CHESTER EARL GRAY, OF EUREKA, CALIFORNIA.

PROCESS AND APPARATUS FOR DESICCATING LIQUID SUBSTANCES.

1,266,013. Specification of Letters Patent. Patented May 14, 1918.

Application filed September 30, 1915. Serial No. 53,386.

*To all whom it may concern:*

Be it known that I, CHESTER EARL GRAY, a citizen of the United States, residing at Eureka, in the county of Humboldt and State of California, have invented a certain new and Improved Process and Apparatus for Desiccating Liquid Substances; and I do hereby declare the following to be a full, clear, and exact description of the same, reference being had to the accompanying drawings, forming part of this specification.

The present invention will be described in connection with the desiccation of milk, although it will be understood that the process and apparatus is equally applicable to the desiccation of any liquid carrying a solid in solution or admixed therewith, the invention being especially adapted for the desiccation of substances which might be altered in composition or characteristic by the application of too high a temperature or substances which are liable to be injuriously affected when dried on a supporting surface in the form of a film.

In accordance with the present invention, the liquid substance to be desiccated is distributed on a desiccating supporting surface, preferably by a spraying operation, and while supported on said surface the moisture is evaporated by currents of drying air caused to flow rapidly over the same and the dried substance is removed from the surface in finely divided or comminuted form, the operation being made continuous by causing the spraying or depositing devices to travel in unison with the devices for removing the dried material but so as to deposit the liquid on the supporting surface after the same has been cleaned of the dried substance. Each portion of the surface thus has the liquid substance progressively deposited thereon, the substance is progressively dried, and progressively removed in succession, the operations taking place in the order named, and the area of the surface being sufficient to insure a proper drying and removal of the substance before the surface receives a new deposit of liquid.

Referring to the accompanying drawings, which illustrate more or less diagrammatically a form of apparatus for carrying the invention into practice,—

Like letters of reference indicate the same parts in both figures.

Figure 1:
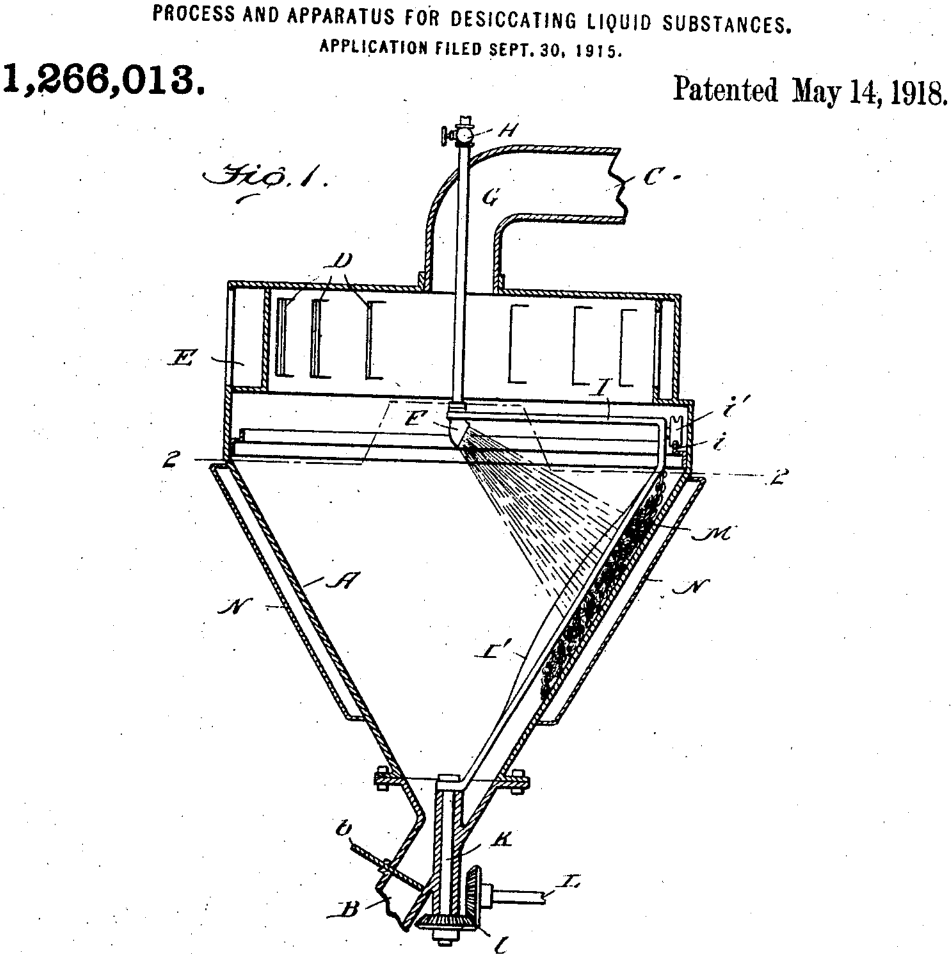
Figure 1 is a vertical section through the apparatus.
Figure 2:
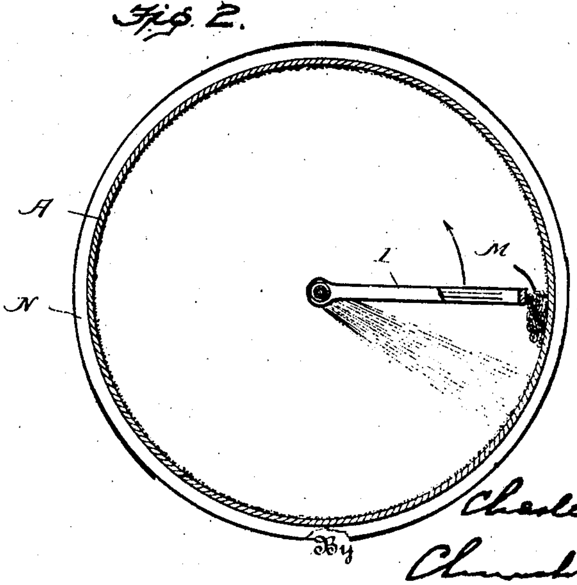
Fig. 2 is a horizontal section substantially on the broken line 2—2 of Fig. 1.

The desiccating chamber, preferably a very large chamber of conical formation within which the supporting surface is formed by the inclined wall A presents a continuous or endless surface upon one portion of which the liquid may be deposited while it is being dried throughout another portion and, when dried, removed by a suitable means provided for the purpose. At the lower end of the desiccating chamber there is a suitable discharge opening B having a valve or regulating device *b* and at the top of the chamber there is a central exit opening C for the moisture laden air and peripheral inlet openings D, the latter communicating with a surrounding inlet chamber or duct E to which drying air is admitted under suitable pressure. The inlet openings D are arranged tangentially so as to impart to the air a whirling movement creating within the chamber a cyclonic action whereby any particles heavier than the air are caused to seek the walls of the chamber and be deposited thereon. Within the chamber and preferably more or less centrally thereof, is a rotary spray nozzle F arranged to direct the liquid in a fan-shaped spray against the inclined wall A. Liquid is supplied to the nozzle under a suitable head through a pipe G having a regulating valve H therein. For rotating the nozzle it is preferably connected with a traveler I, the outer portion of which is conveniently supported by a track *i* and a roller arrangement *i'*. The traveler extends down through the desiccating chamber and may have a vane I' against which the air will impinge for assisting in the rotation of the traveler, and at its lower end it is connected with a shaft K journaled in the lower portion of the chamber and to which rotary motion may be imparted from a drive shaft L and a suitable arrangement of gearing, as, for example, by the bevel gear wheel *l*.

For removing the dried substance from the supporting surface of the traveler it is provided with a surface-engaging portion which is sub-divided in such wise as to insure the removal of the dried substance from the surface in finely divided or comminuted form. Conveniently the traveler is provided with a brush made of a mass of chain links M depending from the traveler and resting in contact with the inner surface of the inclined wall A.

In operation, the various steps proceed progressively; that is to say, the arrangement is such that while the major portion of the surface is constantly exposed to the drying effect of the cyclonic currents of air, the traveler and brush carried thereby advance around the chamber so as to remove the dried substance from each portion of the surface in succession and the spray nozzle is arranged to direct the spray of liquid against the surface in rear of the traveler and brush or on that portion of the surface from which the dried material has been cleaned. The diameter of the drying chamber is such that the liquid deposited by the spray nozzle will be thoroughly dried before the traveler and brush reach the same in their progressive movement around the chamber, and in the preferred operation the spray nozzle is so adjusted that the liquid deposited on the surface of the chamber will not form an unbroken film, but will take on the characteristics of a filamentous deposit, or will be deposited in the form of fine drops, thereby exposing a very large surface area to the action of the drying currents of air within the chamber.

To avoid any danger of cooking the substance on the supporting surface, it may, under some circumstances and for some substances, be desirable to control the temperature of the supporting surface during the drying operation, and this may be conveniently accomplished by jacketing the same, thereby forming a surrounding chamber N through which a circulating medium of proper temperature may be passed to effect the desired control of the temperature of the surface. The surface may be gently heated or heated to a temperature which will assist in the evaporation of the aqueous content of the liquid substance, and under some circumstances, where an exceedingly hot blast of drying air is employed, it may be desirable to keep the temperature of the supporting surface down to a point where the cooking action will be overcome even though the superficial area of the material held by the surface is subjected to an exceedingly high temperature.

In the manufacture of milk powder from previously concentrated milk, the practical value of such regulation will be at once apparent to those skilled in the art. By spraying rather highly concentrated milk in the manner described, it is practicable to produce milk powder which will, in some respects, be superior to milk powder produced by the now well known atomizing process in which the milk is atomized into a drying current of air and the drying or desiccating operation effected while the milk is suspended in the air out of contact with any supporting surface.

It will be noted that the construction of the apparatus is such that the liquid material is deposited on the drying or concentrating surface in a pulverized or comminuted form and the particles are not only moved toward said surface but tend to remain in contact with or in proximity to the same, even when dried or partly dried and detached from the surface owing to the cyclonic action set up in the chamber.

What is claimed is:

1. In apparatus for removing the moisture content of liquid substances and delivering the solids separated therefrom, the combination with a chamber having a circularly arranged stationary drying surface, of means for depositing the liquid substance on said surface in comminuted form including means for creating a cyclonic drying air current through the chamber and over the drying surface for causing the particles of substance to move toward and remain in proximity to said surface when detached therefrom and for carrying off the moisture, and means for mechanically detaching the solid particles of the substance progressively from said surface and for effecting a progressive movement of the same along said surface toward the point of discharge.

2. In apparatus for desiccating liquid substances, the combination with a desiccating chamber having a curved wall forming an internal continuous supporting surface, of a rotary liquid depositing device for progressively depositing the liquid on said internal supporting surface, means for rotating the said devices, means for progressively removing the dried substance from the supporting surface in front of the liquid depositor, and means for directing a whirling body of drying air through said chamber.

3. In apparatus for disiccating liquid substances, the combination with a disiccating chamber of conical formation with means for admitting drying air tangentially and permitting the same to escape centrally of the chamber, a rotary spray nozzle having its openings directed toward one side of the chamber to deposit the liquid on a limited area of the chamber wall, means for rotating said nozzle to progressively deposit the liquid around the circumference of the chamber wall, a traveler rotating in unison with, but in advance of, the nozzle and having sub-divided wall engaging portions for removing the dried substance from the wall in a finely divided condition.

4. In apparatus for removing the moisture content of liquid substances and delivering the solids separated therefrom, the combination with a chamber having a circularly arranged stationary internal drying surface and means for regulating the temperature of said surface located exterior thereto, of means for depositing the liquid substance on said surface in comminuted form including means for creating a cyclonic drying air current through the chamber and over the drying surface for causing the particles of substance to move toward and remain in proximity to said surface when detached therefrom and for carrying off the moisture, and means for mechanically detaching the solid particles of the substance progressively from said surface and for effecting a progressive movement of the same along said surface toward the point of discharge.

CHESTER EARL GRAY.